United States Patent [19]

Kinder

[11] 4,128,023

[45] Dec. 5, 1978

[54] COUPLING APPARATUS

[75] Inventor: Mark R. Kinder, Lafayette, Ind.

[73] Assignee: TRW Inc., Cleveland, Ohio

[21] Appl. No.: 706,447

[22] Filed: Jul. 19, 1976

[51] Int. Cl.² .................. F16H 3/44; F16D 25/00
[52] U.S. Cl. ..................... 74/750 R; 192/87.17; 192/91 A
[58] Field of Search ............. 74/785, 788, 750 R; 192/91 A, 87.17, 87.15, 87.11, 4 A, 4 R

[56] References Cited

U.S. PATENT DOCUMENTS

| | | | |
|---|---|---|---|
| 1,410,384 | 3/1922 | Martino | 74/785 |
| 2,428,128 | 9/1947 | Sheppard | 192/87.15 X |
| 2,465,885 | 3/1949 | Koster et al. | 74/750 R X |
| 3,074,297 | 1/1963 | Sommer et al. | 74/750 R |
| 3,710,650 | 1/1973 | Piret | 192/87.11 X |
| 3,834,498 | 9/1974 | Ashfield | 74/785 X |
| 3,893,556 | 7/1975 | Lech, Jr. et al. | 192/91 A |

Primary Examiner—Samuel Scott
Assistant Examiner—Lance W. Chandler

[57] ABSTRACT

A two-speed transmission unit which couples a rotatable input shaft to a rotatable output shaft. A gear unit includes a sun gear fixed to the input shaft and rotatable therewith. One or more planet gears are disposed for orbital motion around the sun gear, and the planet gears are carried by a planet carrier which orbits with the planet gears about the sun gear. First clutch means is provided for coupling the sun gear to the output shaft for rotating the output shaft at a first angular velocity equal to the angular velocity of the sun gear, and second clutch means is provided for coupling the planet carrier to the output shaft for rotating the output shaft at a second angular velocity equal to the angular velocity of the planet carrier about the sun gear. Both the first and second clutch means are continually biased into engaged condition, and means are provided for (1) selectively placing one clutch means in a disengaged condition and allowing the biasing means to place the other in engaged condition, or (2) placing both clutch means in a disengaged condition, thereby allowing "free wheeling" of the input shaft. There is also provided a fail-safe brake to lock the input and output shafts against rotation when neither clutch means is placed in its disengaged condition.

11 Claims, 1 Drawing Figure

COUPLING APPARATUS

BACKGROUND AND SUMMARY OF THE INVENTION

The present invention relates generally to apparatus for coupling a rotatable driven input shaft to an output shaft for imparting rotary motion to the output shaft. The present invention particularly relates to a two-speed transmission unit for rotating selectively the output shaft at two different speeds and which is also constructed to provide for free wheeling of the output shaft in one mode of operation and for fail-safe braking of the input and output shafts under certain conditions.

Two-speed transmission units for coupling a rotatable input shaft to a rotatable output shaft are well known in the art. Known types of such units include a planetary gearing arrangement which includes a sun gear, one or more planet gears carried on a planet carrier, and a ring gear. Clutches are provided for clutching various parts of the planetary gearing to the output shaft and to each other for purposes of effecting the two-speed drive to the output shaft. A variety of different arrangements are well known and a typical one of these arrangements is shown in U.S. Pat. No. 3,436,986.

According to U.S. Pat. No. 3,436,986 a pair of sun gears are rotatably supported by an input shaft. Separate transmission gear arrangements are associated with each of the sun gears, each transmission gear arrangement including a pinion gear coupled to each sun gear and adapted to couple its respective sun gear to a rotatably supported output shaft to rotate the output shaft at a selected angular velocity. This is a fairly complicated structure requiring numerous part and employing a substantially sized housing to enclose all of the parts.

According to the present invention, a two-speed transmission unit comprises a sun gear fixed to a rotatably supported input shaft and rotatable therewith about the central axis of the input shaft. One or more planet gears are disposed for orbital motion around the central axis of the sun gear, and the planet gears are connected to a planet carrier which fixes the planet gears for orbit about the central axis of the sun gear. First clutch means are provided for coupling the sun gear to the output shaft for rotating the output shaft at a first angular velocity equal to the angular velocity of the sun gear, and second clutch means are provided for coupling the planet carrier to the output shaft for rotating the output shaft at a second angular velocity equal to the velocity of the planet carrier about the sun gear.

The first clutch means preferably takes the form of a series of friction disc members rotationally fixed to the output shaft, and another series of friction disc members rotationally fixed to the sun gear. Both sets of friction disc members are mounted for axial movement relative to the output shaft. First piston means are provided for selectively compressing the friction disc members against each other so that their friction surfaces engage each other to engage the clutch means and to transmit the rotary motion of the sun gear to the output shaft.

The second clutch means also preferably takes the form of a series of friction discs rotationally fixed with respect to the output shaft, and a another series of friction discs rotationally fixed to the planet carrier. Second piston means are provided for selectively compressing the second set of friction disc members against each other to urge their friction surfaces against each other to engage the clutch means to transmit the motion of the planet carrier to the output shaft.

In another feature of the present invention means are provided for selectively placing the first and second clutch means in a condition in which (1) one clutch means is selectively engaged to transmit rotary motion to the output shaft while the other clutch means is selectively disengaged, or (2) both clutch means are disengaged in order to allow the input shaft to be rotated without transmitting any rotation to the output shaft (i.e., the input shaft "free wheels"). neither clutch means is disengaged, the system is designed to place both clutch means in engaged condition, thereby providing for fail-safe braking of the input and output shafts.

In the preferred embodiment, spring force applying means are provided between the pistons associated with the first and second clutch means and are adapted to continuously urge both of the pistons in directions tending to cause engagement of their respective clutch means with its respective gear (or planet carrier) and the output shaft. Fluid pressure applying means are provided in connection with each piston and are selectively operative to hydraulically urge either piston in a direction against the bias of the spring force applying means, to thereby disengage the clutch means. Whenever the fluid pressure applying means are not effective to disengage either clutch means, the spring means places both clutch means in engaged condition, thereby providing for fail-safe braking of the system.

BRIEF DESCRIPTION OF THE DRAWINGS

The further objects and advantages of this invention will become further apparent from the following detailed description taken with reference to the accompanying drawing in which.

DETAILED DESCRIPTION OF THE PREFERRED EMBODIMENT

Figure 1:
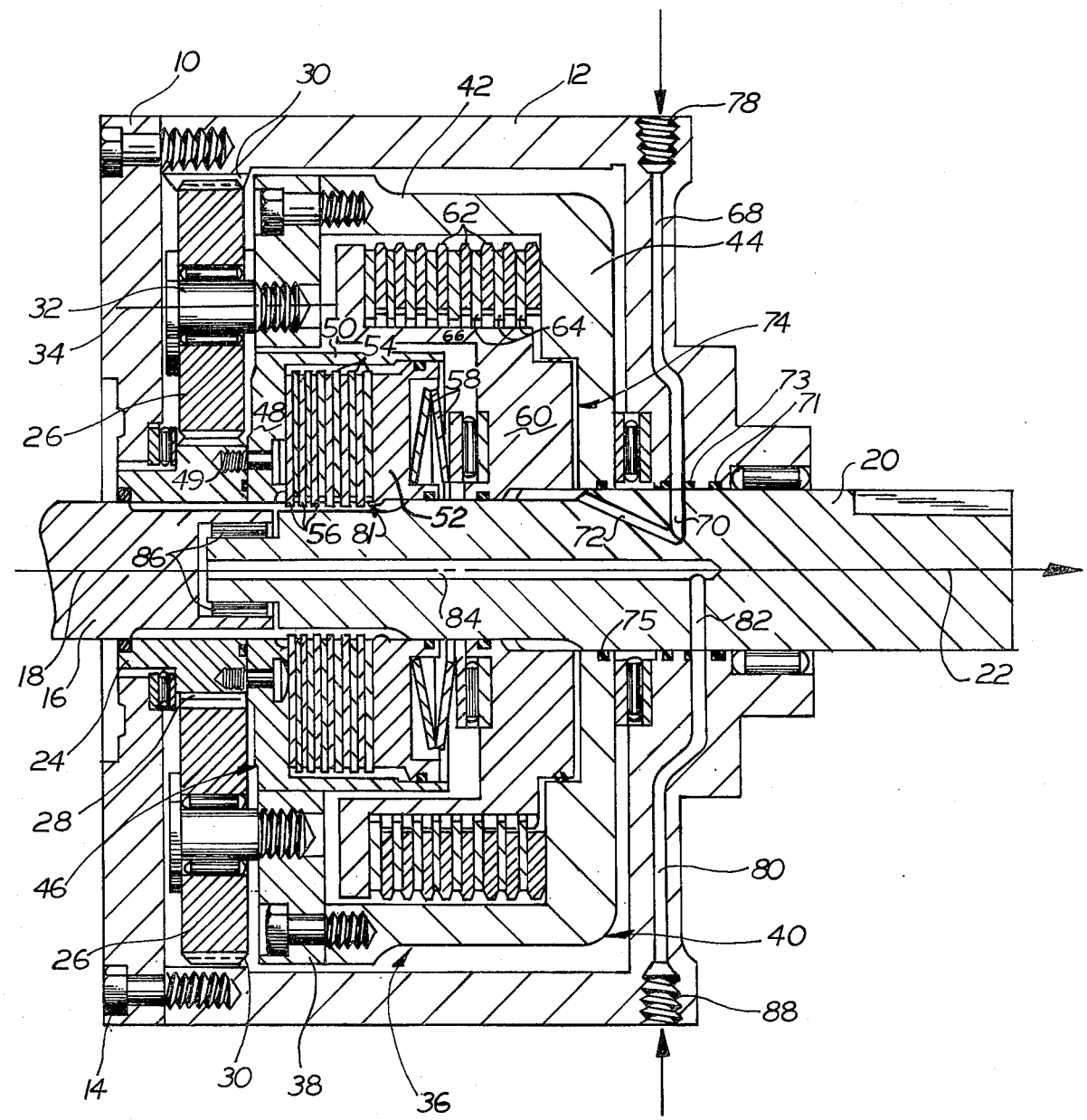
FIG. 1 is a cross-sectional view of a gear reduction unit constructed according to the principle of the present invention.

As set forth above the present invention relates to a apparatus for coupling a rotated input shaft to a rotatably supported output shaft. In FIG. 1, a pair of housing sections 10 and 12 are provided and joined to each other by a series of threaded bolts 14. An axially extending input shaft 16 is journaled in the housing section 10 for rotation about its central axis 18. The input shaft 16 is designed to be rotated about its central axis 18 by any conventional means (not shown).

An axially extending output shaft 20 is rotatably journaled in the housing section 12 for rotation about its central axis 22. In the illustrated embodiment the central axis of the output shaft 20 is coaxial with the central axis 18 of the input shaft 16.

A transmission unit for coupling the input shaft 16 to the output shaft 20 is supported within the housing members 10, 12. A sun gear 24 is splined to the output shaft 16 and rotates therewith at a first angular velocity about the central axis 18 of the input shaft, the central axis 18 also defining the central axis of the sun gear. One or more planet gears 26 are disposed in meshing engagemwent with the external teeth 28 of the sun gear 24 and with a ring gear formed by an annular series of teeth 30 fixed to the inner surface of housing member 12. Each planet gear 26 is rotatably supported on a shaft 32 and each planet gear rotates about the central axis 34 of its respective shaft as it orbits about the central axis 18 of the sun gear. The orbital movement of the planet gears 26 about the sun gear serves to rotate the shafts 32 about the central axis 18 of the sun gear.

Also disposed within the housing sections is a planet carrier 36. In the disclosed embodiment the planet carrier includes a ring shaped member 38 and a housing member 40 fixedly secured to the ring shaped member 38. Housing member 40 includes a cylindrical portion 42 and a radially extending portion 44. The ring member 38 is fixed to the central shafts 32 of the planet gears and the combined ring member 38 and housing member 40 is rotated with the shafts 32 about the central axis 18 of the sun gear 24 at a second angular velocity.

A first clutch means is provided for coupling the sun gear to the output shaft for rotating the output shaft about its central axis at the angular velocity of the sun gear. In the illustrated embodiment a housing member 46 is fixedly secured to the sun gear 24 by a series of threaded bolts 49. Housing member 46 includes a radial wall 48 and a cylindrical wall 50. A first piston member 52 is disposed for axial sliding movement in the housing member 46, and the area between the piston 52, and housing walls 48 and 50 defines a fluid chamber, as explained more fully hereinafter.

A plurality of axially spaced friction disc members 54 are splined to a inner surface of cylindrical wall 50. The spline connection between the friction disc members 54 and the cylindrical wall 50 is such that the friction disc members 54 are rotationally fixed to the housing member 46 and the sun gear 24 but are axially movable relative to the central axis 22 of the output shaft. Interposed between the friction disc members 54 are a second series of friction disc members 56 which are rotationally fixed to the output shaft 20. The second set of friction disc members 56 can also move axially relative to the central axis 22 of the output shaft. The radial surfaces of the friction disc members 54, 56, when engaged with each other, provide a high degree of frictional resistance to relative rotational movement.

Means are provided for axially forcing the friction disc members 54, 56 into engagement with each other for coupling the sun gear 24 to the output shaft 22. In the disclosed embodiment the piston 52 is moved axially toward housing wall 48 to force the disc members 54, 56 into engagement with one another. The piston 54 is continuously urged toward housing wall 48 by a spring force applying means which, as disclosed in FIG. 1, preferably takes the form of a series of Belleville washers 58.

A second clutch means is provided for coupling the planet carrier 40 to the output shaft 20 for rotating the output shaft about its central axis at the angular velocity of the planet carrier about the central axis of the sun gear. According to the disclosed embodiment a second piston member 60 is splined to the output shaft 20 for rotary movement therewith and for axial movement relative thereto. A first series of axially spaced frictional disc members 62 are splined to cylindrical wall 42 of the carrier, and are axially movable relative thereto. A second series of disc members 64 are splined to a wall portion 66 of the piston member 60 and are axially movable relative thereto. Axial movement of piston member 60 urges the disc members 62, 64 into frictional engagement with each other to couple the carrier through the piston member 60 to the output shaft 20. A spring force applying means continuously exerts a biasing force on the piston member 60 and tending to urge the piston member 60 in a first direction tending to urge the disc members 62, 64 into frictional engagement with one another. In the illustrated embodiment the spring force applying means is provided by the Belleville washers 58, which act directly between the first piston member 52 and the second piston member 60.

According to the present invention means are provided for (1) selectively placing one clutch means in an engaged condition while disengaging the other clutch means, (2) disengaging both clutch means from the output shaft to thereby allow the input shaft to "free wheel" without being coupled to the output shaft, or (3) allowing both clutch means to be placed in engaged condition to lock the input and output shaft against relative rotation.

According to the preferred embodiment the means for selectively providing for engaging and disengaging the various clutch means includes a fluid pressure system. A first fluid conduit 68 is formed in the housing member 12. Fluid conduit 68 communicates with an annular fluid channel 70 formed in the output shaft 20. A fluid passage 72 formed in the output shaft 20 is in fluid communication with the annular channel 70 and with a chamber space 74 formed between piston 60 and the radial portion 44 of the planet carrier. Fluid pressure directed into fluid conduit 68 (through port 78) is directed to chamber 74 and serves to bias the piston member 60 in a direction against the bias of spring 58 to hold the disc members out of frictional driving engagement with each other (i.e., to disengage the second clutch means).

The fluid pressure system is also effective to place the first clutch means in either an engaged or disengaged condition. A fluid chamber 81 is also formed between housing walls 48, 50 and the piston 52. A fluid conduit 80 formed in the housing section 12 is in fluid communication with a second annular channel 82 formed in the output shaft 20 (annular channels 70 and 82 are sealed from each other by O-rings 71, 73 and 75). A fluid path including a central passage 84 in the output shaft and extending about the bearings 86 (which support the output shaft) places the annular channel 82 in fluid communication with chamber 81. Fluid pressure positively directed into chamber 81 serves to urge the piston 52 against the bias of spring 58 to hold the frictional discs of the first clutch means out of engagement with each other (i.e., to disengage the first clutch means).

By selectively delivering fluid under pressure to port 78 the second clutch means can be selectively disengaged without disengaging the first clutch means. By delivering fluid under pressure to conduit 80 (through port 88) the first clutch means is disengaged without disengaging the second clutch means. By delivering fluid under pressure to both ports 78, 88 both clutch means are disengaged, in which case there is no coupling between the input and output shaft and the input shaft simply "free wheels" in accordance with its input drive. If fluid is not directed to either port, both clutch means are urged into engagement with their respective gear elements and the output shaft by springs 58 and thereby serve to lock the gear elements, the output shaft, and the input shaft against rotational movement, thus providing a fail-safe brake for the system.

Thus, in accordance with the principles of the present invention there is provided a mechanism for coupling a rotatably driven input shaft to an output shaft through a coupling unit which is effective to either transmit a selected angular velocity to a rotatably journaled output shaft, to allow the input shaft to "free wheel" or to provide for fail-safe braking of the input and output shaft. With the foregoing disclosure in mind many and varied modifications of the present invention will become further apparent to those of ordinary skill in the art.

What is claimed is:

1. Apparatus comprising a two-speed transmission unit for coupling a rotatable input shaft to a rotatable output shaft, said unit comprising a sun gear rotatable about a central axis thereof, means for fixedly mounting said sun gear on said input shaft for rotation in response to rotation of the input shaft, a ring gear encircling said sun gear, at least one planet gear in meshing engagement with said sun gear and said ring gear with the central axis of said planet gear adapted to orbit about the central axis of said sun gear, a planet carrier carrying said planet gear and rotatable therewith about the central axis of said sun gear, means supporting said planet carrier for rotation about an axis coaxial with the axes of said input shaft and said sun gear, first clutch means selectively engageable to connect said sun gear to said output shaft for rotating said output shaft at a first angular velocity equal to the angular velocity of said sun gear, second clutch means selectively engageable to connect said planet carrier to said output shaft for rotating said output shaft at a second angular velocity at a speed equal to the angular velocity of the planet carrier about the sun gear, means continuously biasing both of said first and second clutch means into engaged condition, and means for selectively placing either of said first and second clutch means in a disengaged condition, said biasing means serving to place both of said first and second clutch means in engaged condition to lock said input and output shafts against rotation whenever neither of said first nor said second clutch means is placed in disengaged condition.

2. Apparatus as set forth in claim 1 wherein said first clutch means comprises a housing member fixedly connected to said sun gear, one or more friction members having first friction surfaces rotationally fixed to said housing member, one or more friction members having second friction surfaces rotationally fixed to said output shaft, each of said friction members being axially movable with respect to said sun gear and said output shaft, and means for axially forcing the friction surfaces of said friction members into frictional engagement with each other for coupling said sun gear to said output shaft.

3. Apparatus as set forth in claim 2 wherein said second clutch means comprises one or more friction members rotationally fixed to said planet carrier, one or more friction members rotationally fixed to a wall member which is rotationally fixed with respect to said output shaft, said first and second friction members being axially movable relative to the central axis of said output shaft, and means for selectively urging said friction members into an engagement with each other for connecting said planet carrier through said wall member to said output shaft.

4. Apparatus as set forth in claim 3 including first piston means movable in a first direction to force the friction surfaces of said first clutch means against one another and movable in a second direction to release the friction surfaces from engagement with one another, second piston means movable in a first direction to force the friction surfaces of said second clutch means into engagement with one another and movable in a second direction to release the friction surfaces from engagement with each other.

5. Apparatus as set forth in claim 4 wherein said means for continuously biasing both of said first and second clutch means into engaged condition comprises spring means for continuously biasing each of said first and second piston means in its respective first direction, said means for selectively placing either of said first and second clutch means in a disengaged condition comprising fluid actuating means in communication with each of said first and second piston means and being selectively actuatable to force either or both of said first and second piston means in their respective second directions against the bias of the spring means.

6. Apparatus as set forth in claim 5 wherein said spring means includes spring means acting directly between said first and second piston means.

7. Apparatus as set forth in claim 6 including housing means enclosing said sun gear said pinion gear and said first and second clutch means, first fluid port means extending through a portion of said housing and including fluid conduits for directing fluid to a first side of said first piston means for forcing said first piston means in said second direction, second fluid means including a portion formed in said housing means and including means for directing fluid against said second piston to force said second piston in its respective secondary direction against the bias of the spring means.

8. Apparatus as set forth in claim 7 wherein said fluid means associated with each of said first and second fluid means comprises a fluid conduit means formed in said output shaft.

9. Apparatus comprising a two-speed transmission unit for coupling a rotatable input shaft to a rotatable output shaft, said unit comprising a sun gear rotatable about a central axis thereof, means for fixedly mounting said sun gear on said input shaft for rotation in response to rotation of the input shaft, a ring gear encircling said sun gear, at least one planet gear in meshing engagement with said sun gear and said ring gear with the central axis of said planet gear adapted to orbit about the central axis of said sun gear, a planet carrier carrying said planet gear and rotatable therewith about the central axis of said sun gear, means supporting said planet carrier for rotation about an axis coaxial with the axes of said input shaft and said sun gear, first friction clutch means selectively engageable to connect said sun gear to said output shaft for rotating said output shaft at a first angular velocity equal to the angular velocity of said sun gear, second friction clutch means selectively engageable to connect said planet carrier to said output shaft for rotating said output shaft at a second angular velocity at a speed equal to the angular velocity of the planet carrier about the sun gear, each of said first and second friction clutches being selectively disengageable independently of the other clutch, and means for selectively placing either of said friction clutch means in an engaged or disengaged position.

10. Apparatus as defined in claim 9 wherein said last-recited means comprises means for placing both clutch means in an engaged or disengaged position.

11. Apparatus comprising a two-speed transmission unit for coupling a rotatable input shaft to a rotatable output shaft, said unit comprising a sun gear rotatable about a central axis thereof, means for fixedly mounting said sun gear on said input shaft for rotation in response to rotation of the input shaft, a ring gear encircling said sun gear, at least one planet gear in meshing engagement with said sun gear and said ring gear with the central axis of said planet gear adapted to orbit about the central axis of said sun gear, a planet carrier carrying said planet gear and rotatable therewith about the central axis of said sun gear, means supporting said planet carrier for rotation about an axis coaxial with the axes of said input shaft and said sun gear, first friction clutch means selectively engageable to connect said sun gear to said output shaft for rotating said output shaft at a first angular velocity equal to the angular velocity of said sun gear, and second friction clutch means selectively engageable to connect said planet carrier to said output shaft for rotating said output shaft at a second angular velocity at a speed equal to the angular velocity of the planet carrier about the sun gear, each of said first and second friction clutches being selectively disengageable independently of the other clutch.

* * * * *